United States Patent [19]
Senft et al.

[11] Patent Number: 4,889,007
[45] Date of Patent: Dec. 26, 1989

[54] ADJUSTING DEVICE FOR A VEHICLE PARKING BRAKE

[75] Inventors: Ernst Senft, Möglingen; Herbert Klemmer, Nürtingen; Ullrich Uhl, Aalen; Emil Näumann, Reichenbach; Nikolaus Schefcsik, Schwaikheim, all of Fed. Rep. of Germany

[73] Assignee: Daimler-Benz AG, Stuttgart, Fed. Rep. of Germany

[21] Appl. No.: 369,186

[22] Filed: Jun. 21, 1989

[30] Foreign Application Priority Data

Jul. 2, 1988 [DE] Fed. Rep. of Germany ....... 3822436

[51] Int. Cl.⁴ .......................... F16C 1/10; G05G 5/06; F16D 65/38
[52] U.S. Cl. ..................................... 74/506; 74/500.5; 74/501.5 R; 74/527; 74/575; 74/577 M; 74/505; 188/2 D; 188/196 F; 49/352
[58] Field of Search ............... 74/501.5 R, 500.5, 504, 74/506, 89.21, 89.22, 527, 575, 577 M; 188/2 D, 24.19, 196 F; 49/352; 464/83, 93

[56] References Cited

U.S. PATENT DOCUMENTS

| | | | |
|---|---|---|---|
| 3,176,539 | 4/1965 | Mersereau | 74/505 |
| 4,428,542 | 1/1984 | Kobayashi et al. | 74/505 X |
| 4,503,732 | 3/1985 | Schust | 74/505 X |
| 4,595,085 | 6/1986 | Le Marchand et al. | 188/196 F X |
| 4,628,759 | 12/1986 | Kobayashi et al. | 74/501.5 R |
| 4,631,864 | 12/1986 | Barros | 242/157.1 X |
| 4,753,125 | 6/1988 | Fukumoto et al. | 74/504 |
| 4,821,589 | 4/1989 | Fukumoto et al. | 49/352 X |

FOREIGN PATENT DOCUMENTS

| | | | |
|---|---|---|---|
| 200172 | 11/1955 | Australia | 74/505 |
| 2433012 | 1/1975 | Fed. Rep. of Germany | 74/504 |
| 3343268 | 3/1985 | Fed. Rep. of Germany | 188/2 D |
| 388903 | 3/1933 | United Kingdom | 74/505 |
| 631131 | 10/1949 | United Kingdom | 49/352 |
| 1421039 | 1/1976 | United Kingdom | 188/196 F |

Primary Examiner—Vinh T. Luong
Attorney, Agent, or Firm—Barnes & Thornburg

[57] ABSTRACT

An adjusting device for automatically compensating for cable strand elongation in a vehicle parking brake utilizes a rotatable disc cam having a circumferential edge which spirals radially out to effect a displacement of a cable yoke in a cable tensioning direction as slack develops in a cable strand of the parking brake. The disc cam is tensioned by a torsion spring, the entire device having a small number of parts and high operational reliability even when dirty.

8 Claims, 2 Drawing Sheets

ADJUSTING DEVICE FOR A VEHICLE PARKING BRAKE

BACKGROUND AND SUMMARY OF THE INVENTION

The invention relates to an adjusting device for a vehicle parking brake for the automatic compensation of cable stand elongations, and more particularly to such an adjusting device having a small number of parts and high operational reliability, even when dirty.

An adjusting device which is to be installed exposed on the underside of the vehicle body for automatically compensating for cable strand elongation in a vehicle parking brake arrangement is disclosed by unpublished Patent Application No. P 3,741,529.8.

In this construction a cable yoke is formed by two yoke elements of identical construction arranged symmetrically and pivotably on a bearing axis. Each yoke element holds a cable strand and are each equipped with a catch tooth forming a bracing element which is retained in engagement with a catch tooth system provided on a U-shaped traction plate by a torsion spring.

The bearing axis which carries the yoke elements is guided slidably by each of its axis ends in a guide slot extending in the tensioning direction of the cable strands, the guide slots being provided in mutually opposite members of the U-shaped traction plate.

A tensioning device which serves for the automatic compensation of elongations which occur in the cable strands has a permanent tendency to slide the bearing axis with the yoke elements in the tensioning direction relative to the traction plate. The tensioning device is equipped for this purpose with a compression spring which is braced against the yoke elements and against the traction plate.

Accordingly, it is an object of the present invention to provide an adjusting device for automatically compensating for cable elongation in a vehicle parking brake arrangement, which has a smaller number of components, and high operational reliability, even in an extremely dirty state.

The adjusting device according to preferred embodiments of the invention advantageously features only a one-piece cable yoke, a bracing element and a catch tooth system, parts which can be structurally designed and arranged in such a way that any jamming caused by dirt particles of the components required to be moved by the tensioning device can be effectively prevented.

The arrangement of the catch tooth system on the circumference of a disc cam mounted on or constructed integrally with a bearing axis of the cable yoke and which is rotated by a torsion spring relative to the bracing element cooperating with the catch tooth system and anchored on the traction plate in order to adjust the cable strands, ensures an automatic cleaning of the dual catch recesses upon the engagement of the bracing element into them. As a result any dirt in the catch recess is then displaced out of the relevant catch recess. It is favorable for this purpose if the catch recesses of the disc cam, which rises steadily at the circumference, are trough-shaped considered in their axial direction, and if the bracing element exhibits a catching part adapted to the cross-sectional form of the catch recesses.

Other objects, advantages and novel features of the present invention will become apparent from the following detailed description of the invention when considered in conjunction with the accompanying drawings.

DETAILED DESCRIPTION OF THE DRAWINGS

Figure 1:
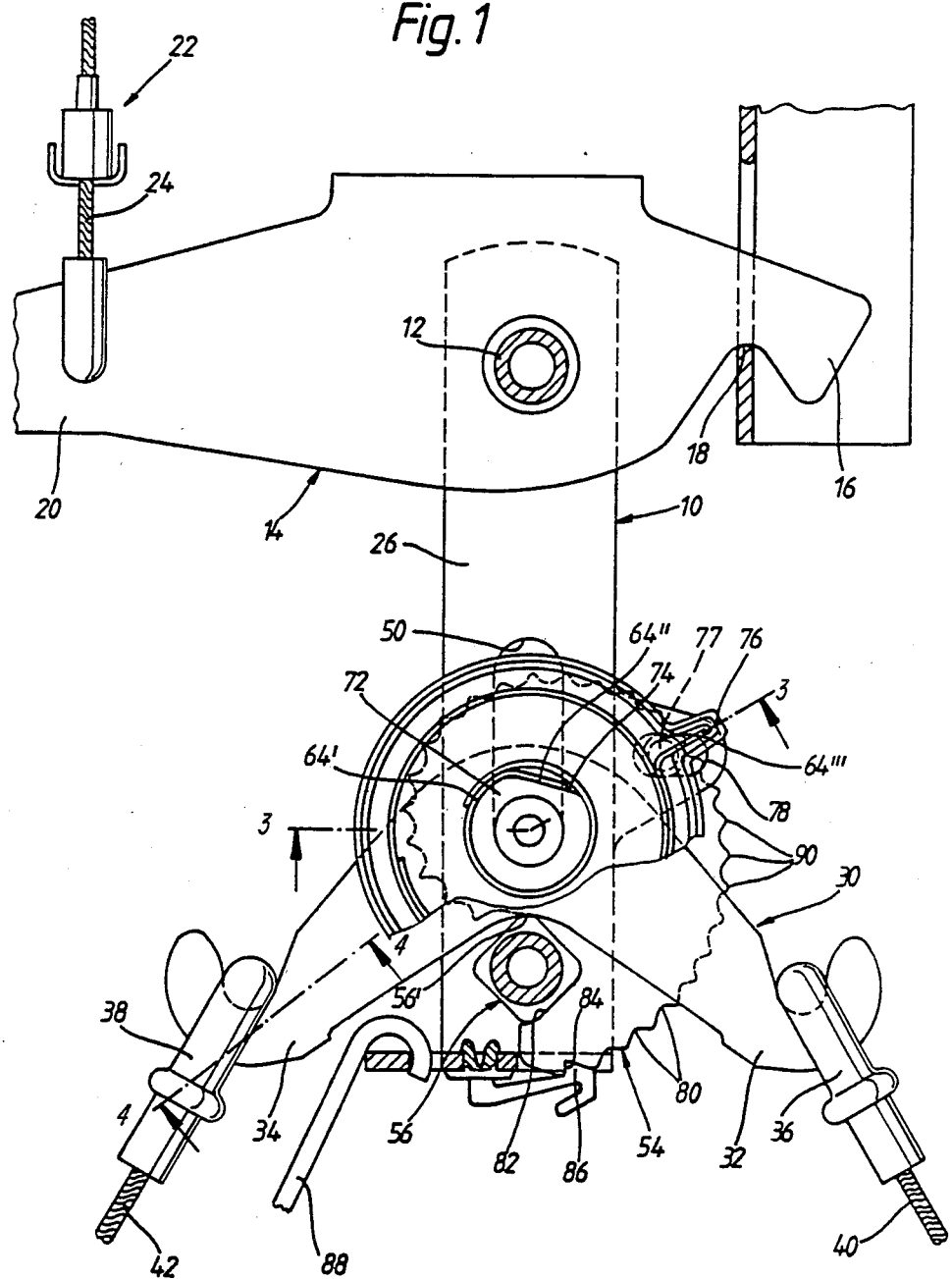
FIG. 1 shows a partly fragmented elevation of the adjusting device according to one embodiment of the present invention, viewed in the direction of the arrow A in FIG. 2.

An exemplary embodiment of an adjusting device according to the invention is illustrated in the drawings and will be described below.

The adjusting device has a traction plate, designated 10, which is articulated at one end, by a pivot axis 12, to a double-armed intermediate lever 14. A shorter lever arm 16 of the lever 14 is braced against an abutment 18 arranged fixed on the underside of the body of a vehicle. A longer lever arm 20 of the lever 14 is articulated to a traction cable 24, forming the core of a Bowden train 22, and leading to a hand brake lever or to an actuating pedal of a foot parking brake.

The traction plate 10 has two plate members 26 and 28 arranged substantially parallel to and spaced from each other, between which a cable yoke, generally indicated at 30, is guided slidably in the longitudinal direction of the traction plate 10. The cable yoke 30 is of one-piece construction and has two yoke end pieces 32 and 34, each projecting beyond the sides of the traction plate 10, and forming engaging hooks. Into each hook, for example, an eye 36 or 38 of a cable strand 40 or 42 is engageable, which each lead to one of the wheel brakes associated with a vehicle axle. Each of the two cable strands 40 and 42 forms the core of a Bowden train.

The cable yoke 30 is mounted pivotably on a bearing axis 44 arranged between the plate members 26 and 28. Axis ends 46 and 48 of the bearing axis 44 each form guide studs which engage respectively into guide slots 50, 52 formed in respective plate members 26, 28, the guide slots 50, 52 extending in a longitudinal direction of the traction plate 10.

A disc cam, generally indicated at 54, which forms an eccentric, is also mounted on the bearing axis 44. It is braced by a part of its circumference against a bracing element 56 which is retained, by riveting for example, in the region of the free end of the traction plate 10 between the plate members 26 and 28.

In order to introduce the tensile forces which come into operation along the cable strands 40, 42 when the parking brake is actuated, yoke 30 is equipped with two yoke members 30' and 30" symmetrically arranged relative to the longitudinal center of the bearing axis. The two yoke members 30', 30" are provided parallel to and spaced from each other, the free ends of which are connected to each other by welding to form the hook-shaped yoke end pieces 32 and 34 respectively. This construction of the cable yoke 30 permits the disc cam 54 to be arranged nonrotatably on the bearing axis 44 between the yoke members 30', 30" (FIG. 2).

So that a play-free arrangement of the yoke members 30', 30" in the axial direction of the bearing axis 44 is ensured, the disc cam 54 abuts the inside of the yoke member 30' flat with its one end face 58, whereas a friction disc 60 made of suitable plastic or as a spring disc, for example, is interposed between the other yoke member 30" and the disc cam 54 to effect an axial tensioning between these parts.

The frictional securing means achieved in this way between disc cam 54 and cable yoke 30 also has a further function, which will be explained in more detail below.

Figure 2:
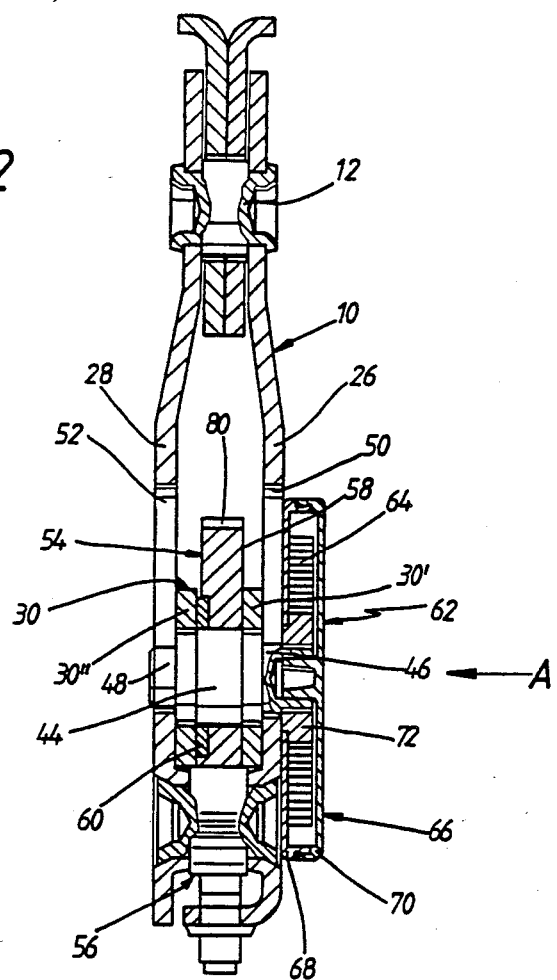
FIG. 2 shows a longitudinal section of the adjusting device of FIG. 1.

By means of a tensioning device, generally indicated at 62, the cable yoke 30 is slidable automatically upwards in the longitudinal direction of the traction plate 10 according to FIG. 2 in order to compensate for strand elongations which develop in the cable strands 40 and 42. It is equipped for this purpose with a helicoidal spring 64 which is housed in a spring capsule 66 on the outside of the plate member 26, for example. The capsule is formed by a plastic molding and by two mutually separable capsule sections 68, 70, capsule section 70 forming a removable cap. The bearing axis 44 then projects with its stud-shaped axis end 46 into the spring capsule 66, where it carries a nonrotatably attached driver disc 72, which preferably consists of plastic and is preferably pressed onto a milled circumferential part of the guide stud 46.

The helicoidal spring 64 is fitted onto the circumference of said driver disc 72 by its innermost spring turn 64', which rests by its free end piece 64" upon a circumferential flattening 74 of the driver disc 72. The helicoidal spring 64 projects by its outer spring end 64''' into a capsule lug 76 formed on the circumference of the spring capsule 66.

The spring capsule 66 itself is mounted as a whole on the axis end 46 of the bearing axis 44 and is anchored against rotation on the plate member 26.

Figure 3:
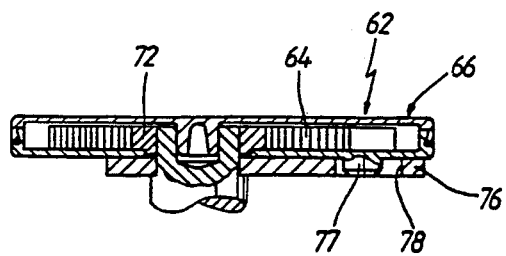
FIG. 3 shows a section through a spring capsule of a tensioning device of the adjusting, viewed along the line III—III of FIG. 1.
Figure 4:
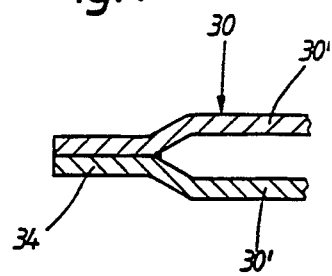
FIG. 4 shows a partial section along the line IV—IV of FIG. 1.

For this purpose a cylindrical lug 77, formed on the capsule section 68 adjacent to the plate member 26 (FIG. 3), can be brought into engagement with a slot 78 extending at substantially right angles to the guide slot 50 of the plate member 26. The necessary conditions for the tensioning of the helicoidal spring 64 are created, by first mounting the helicoidal spring 64 into the open spring capsule and onto the driver disc 72. The inner spring end 64" is mounted on the driver disc 72 and the outer spring end 64" is introduced into the capsule lug 76, after which the spring capsule 66 with the driver disc 72 is slid onto the axis end 46 of the bearing axis 44 with cylindrical capsule lug 77 out of engagement with the slot 78.

After this the spring capsule 66 can be manually rotated appropriately to tension the helicoidal spring 64, and finally adjusted so that the cylindrical lug 77 is brought into engagement into the slot 78 of the plate member 78. For this purpose the spring capsule 66 should then be brought into its final assembly position shown if FIG. 2, by pushing its driver disc 72 completely onto the axis end 46 of the bearing axis 44.

As FIG. 1 shows, the eccentric disc cam 54 has, considered in its axial direction, trough-shaped catch recesses 80 which are directly adjacent to each other. The bracing element 56, which is preferably lozenge-shaped in cross-section, comes into engagement with the catch recessed 80 by its rounded, radially inner edge part 56'.

The disc cam 54 is constructed in such a way in the transitional region between its inner and outer circumferential part that, at its initial position, the lozenge-shaped bracing element 56 engages substantially positively into a corresponding depressing 82 of the disc cam 54.

In the end region of its outer circumferential part, the disc cam 54 is equipped with a circumferential depression 84, with which a preferably flexible retaining hook 86 anchored on the free end of the traction plate 10 is associated and can be brought into engagement with the cam disc 54 as shown in FIG. 1. The retaining hook 56 has the purpose of fixing the disc cam 54 at its initial position, shown in FIG. 1, on the traction plate 10 after the helicoidal spring 64 has been pretensioned. In the assembled state of the adjusting device, the traction plate 10 can be anchored in its operative position by a traction hook 88 engaged on the underside of the vehicle body.

As explained above, the adjusting device after full assembly and with the helicoidal spring 64 under maximum tension, can be locked by the retaining hook 86 (FIG. 1). It can then be fitted into the vehicle in the locked state, after which the retaining hook 86 should be moved out of engagement with the circumferential depression 84 of the disc cam 54 in order to tension the cable strands 40, 42. This has the result that the helicoidal spring 64 will unwind to a certain extent and rotate the disc cam 54 correspondingly. The disc cam 54 which spirals radially outward at the circumference causes, during its rotation relative to the bracing element 56, a radial displacement of the bearing axis 44 with cable yoke 30 and tensioning device 62 in the longitudinal direction of the guide slots 50, 52 relative to the traction plate 10, which in turn leads to the tightening of the cable strands 40, 42.

As FIG. 1 shows, the radius of the rounded edge part 56' of the bracing element 56 is chosen smaller than the concave curvature of the catch recesses 80. This achieves the advantage that as the circumferential projections 90 of the disc cam 54 which are present between the catch recessed 80 are traveled over, any rust which may have settled in the catch recesses 80, and accumulating dirt particles, are rubbed and displaced out of the catch recessed 80 when the rounded edge part 56' of the bracing element 56 moves into them.

Another advantage of the construction is that due to the wedge-shaped construction of the edge part 56' of the bracing element 56 which comes into engagement with the catch recesses 80, the disc cam 54 will adjust itself so that the edge part 56' is located in the center of a catch recess 80. Therefore when the circumferential projections 90 of the disc cam 54 which separate the catch recessed 80 from each other are traveled over, the cable strands 40, 42 are placed under maximum tension and then immediately loosened somewhat again, the loosening being kept within narrow limits by the rotation of the disc cam 54. The adjustment play which thereby comes about ensures that the relevant brake installation can be released reliably.

The friction disc 60 discussed previously, also has the further function to anchor the disc cam 54 in the traction plate 10 and thereby to maintain the adjustment of the adjusting device.

If the adjusting device should fail, or the automatic tightening of the cable strands 40, 42 cease, the driver of the relevant vehicle will detect this immediately from the fact that, for example, the actuating stroke of the pedal to be operated will become correspondingly longer. From this the driver can detect that the adjusting device requires to be repaired or exchanged. In case a replacement adjusting device is not available for an exchange, it is then possible for the disc cam 54 to be rotated appropriately and manually, and the adjusting device adjusted in an emergency.

In addition to its simple construction, the embodiment explained also provides an arrangement for securing the helicoidal spring 64 completely from dirt, and also for absorbing high operating loads reliably by the arrangement of bracing element 56 and disc cam 54.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Adjusting device for an automatic compensation of cable strand elongations in a vehicle parking brake comprising;

an elongate traction plate means actuable by a traction cable of an actuating device, an integrally constructed cable yoke means having end pieces projecting laterally from the traction plate means, each end piece for retaining a cable strand, the cable yoke means having a bearing axis guided slidably along the traction plate means to tension each cable strand, a bracing element anchored on the traction plate means, and a tensioning means having a permanently operative pretensioned spring braced against the traction plate means to bias the cable yoke means in a tensioning adjustment direction, the tensioning means having a disc cam means which is arranged on the bearing axis in common with the integrally constructed cable yoke means and is rotatable by the spring as slack develops in at least one of each cable strand, the disc cam means having catch recesses along its circumference which cooperate with the bracing element anchored on the traction plate means, a spacing of the catch recesses from the bearing axis increases in the tensioning adjustment direction as the disc cam means is rotated.

2. Adjusting device according to claim 1, wherein the spring is a torsion spring comprising a helicoidal spring mounted on the bearing axis.

3. Adjusting device according to claim 1, wherein the catch recesses of the disc cam means which spirals radially outward at the circumference, are trough-shaped as viewed from their axial direction and wherein the bracing element has a rounded catching part having a radius which is smaller than a radius of the trough-shaped catch recesses 4. Adjusting device according to claim 2, wherein the yoke means comprises two yoke members which are connected to each other at their ends, the disc cam means being arranged between the two yoke members which are mounted on the bearing axis and the traction plate means comprising two plate members between which is retained the bearing element, the two yoke members being arranged between two plate members of the traction plate means.

5. Adjusting device according to claim 4, wherein the helicoidal spring is provided on an outside of one of the two plate members.

6. Adjusting device according to claim 5, wherein the helicoidal spring is housed in a spring capsule anchored to the adjacent plate means.

7. Adjusting device according to claim 1, wherein a securing hook means is arranged on the traction plate means for engaging a circumferential depression provided on an outer cam end region of the disc cam means.

8. Adjusting device according to claim 4, wherein a pretensioned friction disc means braced against the bearing axis is arranged on the bearing axis between the disc cam means and at least one of the two yoke members.

* * * * *